March 20, 1962 B. J. OPPENHEIM 3,025,706
TEMPERATURE SENSING DEVICE
Filed Nov. 20, 1957
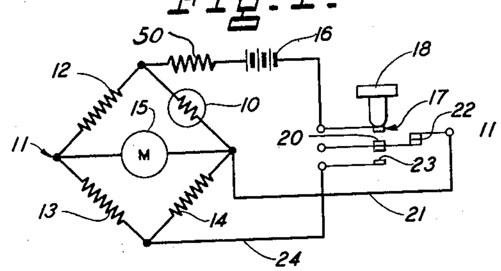
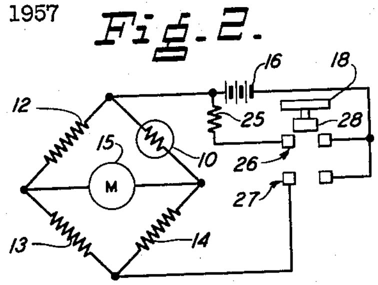
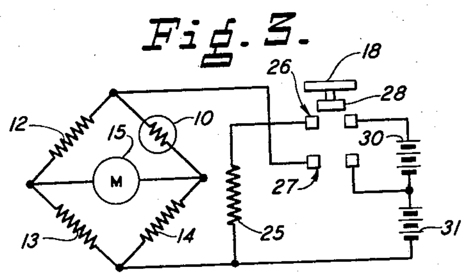
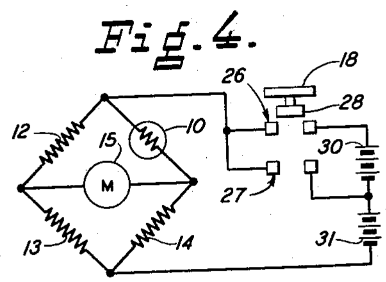
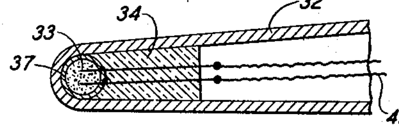
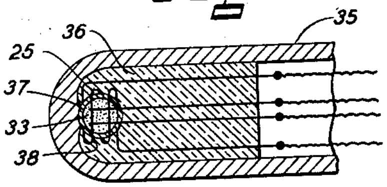
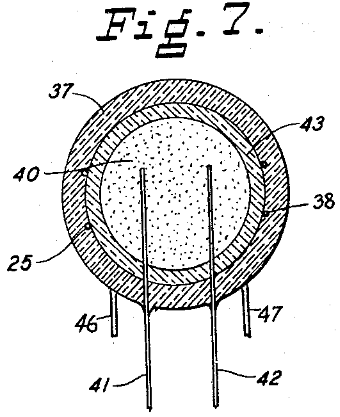
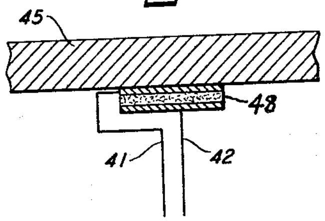
INVENTOR.
BEN J. OPPENHEIM
BY Albert F. Kronman
ATTORNEY United States Patent Office 3,025,706

Patented Mar. 20, 1962

3,025,706

TEMPERATURE SENSING DEVICE

Ben J. Oppenheim, East Orange, N.J., assignor to Victory Engineering Corporation, Union, N.J., a corporation of Delaware Filed Nov. 20, 1957, Ser. No. 697,553
1 Claim. (Cl. 73—362)

This invention relates to a temperature sensing device employing a thermistor and its associated circuit, and has particular reference to a means for heating the thermistor to the approximate temperature to be measured before starting the actual temperature-measuring operation. The invention also contemplates particular designs of thermistors to aid in a preheating operation and to assist in reducing the time interval for temperature measurement.

Thermistors have been used in the past for the measurement of the temperature of adjacent objects. They can be made very small and can be housed within a hypodermic needle for the measurement of temperatures within the human body. One of the difficulties encountered in measuring temperatures that lie in the range above room temperature is the fact that a long time-interval is required to raise the temperature of the thermistor to a temperature which closely approximates the temperature of the body to be measured. The thermistors and the associated circuitry hereinafter described are directed to the reduction of the preliminary heating step, and includes switching means which may be manually operated to reduce the time from an approximation of 2 to 3 minutes to 3 to 10 seconds.

As used hereinafter in the specification and claims, the term "thermistor" may be defined as a resistor with a high negative temperature co-efficient. Thermistors are hard ceramic-like semi-conductors with electrical resistance that varies extensively with changes in temperature. This characteristic is in direct contrast to the behavior of ordinary resistors which normally have a small, temperature co-efficient.

One of the objects of the present invention is to provide an improved thermistor circuit which avoids one or more of the disadvantages and limitations of prior art arrangements.

Another object of the present invention is to decrease the response time of a thermistor used in a circuit which measures temperature.

An object of the present invention is to preheat a thermistor used in a temperature sensing device to its approximate operating temperature.

Another object is to reduce the size of temperature measuring devices.

The invention comprises a thermistor and circuit therefor which includes a resistor element whose resistance varies considerably with its temperature. A four-armed Wheatstone bridge is employed having the thermistor as one of the arms thereof, and a first switching means is provided for causing heat to be applied to the thermistor for a preheating time interval. A second switching means is provided for applying current to opposite junctions of the bridge, and indicating means is connected to the other junction points for providing an indication proportional to the thermistor temperature.

For a better understanding of the present invention, together with other and further objects thereof, reference is made to the following description taken in connection with the accompanying drawings, in which:

FIGURE 1 is a schematic diagram of connections of one form of the measuring circuit.

FIGURE 2 is a schematic diagram of connections of another form of the measuring circuit wherein a separate resistor is employed to heat the thermistor.

FIGURES 3 and 4 show alternate connections of bridge circuits wherein two voltages are employed, one for the preheating period and a second for the measuring period.

FIGURE 5 is a cross-sectional view of a probe which contains a thermistor in thermal contact with the cylindrical probe.

FIGURE 6 is a cross-sectional view of another probe which includes a thermistor and a heater wire, in thermal contact with the thermistor which thermistor is in thermal contact with the probe casing.

FIGURE 7 is a cross-sectional view, greatly enlarged, of a novel form of a heated thermistor which may be used in the above circuits and assemblies.

FIGURE 8 is a fragmentary view, partly in cross-section somewhat enlarged, of another form of thermistor according to the present invention.

Referring to the drawings, and particularly to FIGURE 1, a thermistor 10 is connected as one arm of a four-arm Wheatstone bridge 11, containing resistors 12, 13, and 14, as the other three arms thereof. An indicating device 15, which may be a galvanometer, is connected between two opposite junctions of the bridge, and a current supply circuit is connected between the other junctions. The current supply circuit includes a source of potential 16, which may be a battery, and a switch 17 operated by a manual key 18. The switch includes three pairs of contacts, two normally open and one normally closed. When the switch 17 is in its unactuated position, as shown in FIGURE 1, no current flows. When the switch 17 is depressed part way, the first pair of contacts 20 is closed and current flows from the battery 16, through resistor 50 and thermistor 10, over conductor 21, through contacts 22 and contacts 20, to the other side of the battery. The value of resistor 50 is low enough to permit this current to heat the thermistor to a temperature which depends upon the length of time the switch is held in the preliminary position. At the end of the heating period, the key 18 is depressed an additional amount, and contacts 22 are broken while contacts 20 and 23 are closed. This connection sends current from battery 16 through all four arms of the bridge and back to the battery by means of the conductor 24 and closed switch contacts 20 and 23. In this latter condition self heating does not occur and temperature measurements can be made, the temperature of thermistor 10 being indicated on the meter 15.

The diagram of connections shown in FIGURE 2 includes a bridge circuit with arms 12, 13, 14, as before, and with a thermistor 10. A heater 25 is mounted adjacent to or in thermal contact with the thermistor 10 and is used in the preliminary heating period for raising the temperature of the thermistor to within a range of that of the body to be measured.

The circuit of FIGURE 2 includes a different form of switch having a manual key 18 and two sets of contacts 26 and 27, each pair of contacts being closed by a contactor 28 operated by the key 18. When the key 18 is depressed part way, contactor 28 closes contacts 26 and current from the battery 16 flows through heater 25 and preheats the thermistor. After the preliminary heating period the key 18 is fully depressed, opening contacts 26 and closing contacts 27, thereby sending current through the four arms of the bridge as before, to make the temperature measurement.

The bridge circuit shown in FIGURE 3 is the same as that shown in FIGURE 2, but in this circuit the battery 16 is replaced by two series of connected batteries 30 and 31, this arrangement permitting faster heating. When the contacts 26 are closed, the heater 25 receives current from both batteries 30 and 31. When the contactor 28 closes the contacts 27, only the current from battery 31 is applied to the bridge for giving temperature measuring indication.

The circuit shown in FIGURE 4 includes a bridge circuit which is the same as the bridge circuit shown in FIGURE 1. The battery circuit is similiar to that shown in FIGURE 3. When contacts 26 are closed the entire source of potential is applied to the bridge, causing the thermistor to heat up quickly. As in previous circuits, the closing of contacts 27 places the circuit in condition for temperature measurement.

FIGURE 5 shows an enlarged sectional view of the end of a probe which includes an elongated hollow tube 32 with a small thermistor 33 in thermal contact with the inner end wall portion of the tube. Wires leading to the thermistor 33 are brought out through the hollow portion of the tube 32 and connected to either one of the circuits shown in FIGURES 1 or 4.

The thermistor mounting shown in FIGURE 6 includes a hollow metal cylinder 35 and a thermistor 33 which is in thermal contact with the end of the cylinder 35. A heating coil 38 is positioned around the thermistor for raising its temperature during the preliminary heating period. Four connecting wires, two for the thermistor and two for the heater coil, are brought out through the tube and are connected to either of the circuits shown in FIGURES 2 or 3.

The thermistor assembly shown in FIGURE 7 is particularly adapted for use in conjunction with the above described structure. This device consists of a thermistor 40, including lead wires 41 and 42, and a coating 43 which is either glass, a glaze or some suitable enamel. The heating coil wire 38 is wound over the coating 43 and a second coating 37 which may comprise another layer of glass, a glaze or enamel, is deposited over the first coating 43 and the coil 38. Leads 46, 47 are led through the layer 37 from the coil to the circuit. In this manner rapid heating of the thermistor 40 can be achieved as hereinabove described.

Referring to FIGURE 8, there is shown the application of the device using a disc-type thermistor 48. This thermistor is securely attached in thermal contact with the inside wall of the probe 32, and may be heated by the methods hereinabove described, namely, self-heating or the use of a heater coil adjacent thereto.

It will be obvious from the above description that the thermistor 40 may include a fine heater wire either formed adjacent to the thermistor material or embedded in the enclosing material 36. If a heater is employed, this type of mounting may be used with circuits shown in FIGURES 2 and 3. In addition, the thermistor may be self-heated by the application of current thereto.

Having thus fully described the invention, what is claimed as new and sought to be protected by Letters Patent of the United States is:

A high speed temperature sensing device comprising, a thermistor, a four-armed Wheatstone bridge having the thermistor as one arm and three resistors as the other three arms, a first switching means which connects the thermistor in series with a first source of potential for raising the thermistor temperature to a predetermined range of values, a second switching means in series with a second source of potential and two opposite junctions of said bridge for applying current thereto, and indicating means connected to the other junctions for showing an indication which is proportional to the thermistor temperature.

References Cited in the file of this patent

UNITED STATES PATENTS

| | | |
|---|---|---|
| 960,823 | Clark | June 7, 1910 |
| 1,724,469 | Ghadiali | Aug. 13, 1929 |
| 1,902,427 | Sawyer | Mar. 21, 1933 |
| 2,332,596 | Pearson | Oct. 26, 1943 |
| 2,659,234 | Harrison | Nov. 17, 1953 |
| 2,728,225 | Skibitzke | Dec. 27, 1955 |
| 2,736,784 | Gore | Feb. 28, 1956 |
| 2,800,018 | Philips | July 23, 1957 |
| 2,878,351 | Polye | Mar. 17, 1959 |